US008244180B2

(12) United States Patent
Lim et al.

(10) Patent No.: US 8,244,180 B2
(45) Date of Patent: Aug. 14, 2012

(54) DEVICE AND RECOGNITION CONTROL METHOD AMONG DEVICES

(75) Inventors: Hun Lim, Yongin-si (KR); Jin Wook Lee, Yongin-si (KR); Gene Moo Lee, Seongnam-si (KR); Won Keun Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 992 days.

(21) Appl. No.: 12/037,201

(22) Filed: Feb. 26, 2008

(65) Prior Publication Data

US 2009/0100199 A1 Apr. 16, 2009

(30) Foreign Application Priority Data

Oct. 11, 2007 (KR) .......................... 10-2007-0102734

(51) Int. Cl.
*H04B 7/00* (2006.01)
(52) U.S. Cl. .................. 455/41.2; 455/151.1; 455/151.2; 455/456.1; 455/457; 455/557; 370/338
(58) Field of Classification Search ............... 455/456.1, 455/456.2, 456.3, 456.4, 456.5, 456.6, 457, 455/553.1, 41.1–41.3, 92, 151.1, 151.2, 352, 455/557; 370/331, 332, 338, 310, 328
See application file for complete search history.

(56) References Cited

U.S. PATENT DOCUMENTS

| 7,110,779 | B2 * | 9/2006 | Billhartz et al. | ............. 455/456.2 |
| 7,822,384 | B2 * | 10/2010 | Anschutz et al. | ............. 455/41.2 |
| 2002/0183077 | A1 * | 12/2002 | Fomukong | ..................... 455/456 |
| 2004/0147272 | A1 * | 7/2004 | Shiota et al. | ................... 455/502 |
| 2006/0255935 | A1 * | 11/2006 | Scalisi et al. | .............. 340/539.13 |
| 2007/0149222 | A1 * | 6/2007 | Hodko et al. | ................. 455/461 |
| 2011/0013611 | A1 * | 1/2011 | Chou et al. | ..................... 370/338 |

FOREIGN PATENT DOCUMENTS

| KR | 2003-061124 | 2/2003 |
| KR | 10-2005-0016840 | 2/2005 |
| KR | 10-2006-0036708 | 5/2006 |
| KR | 10-2006-0115099 | 11/2006 |
| KR | 10-2007-0051418 | 5/2007 |

* cited by examiner

Primary Examiner — Anthony Addy
(74) Attorney, Agent, or Firm — NSIP Law

(57) ABSTRACT

A recognition control method among devices, the recognition control method includes receiving a second device recognition signal via a wireless signal module of a first device from a wireless signal module of a second device, and recognizing that the second device is located in a direction from the first device through the second device recognition signal. With respect to the second device, the method includes receiving a first device recognition signal via the wireless signal module of the second device from the wireless signal module of the first device, and recognizing that the first device is located in a direction from the second device through the first device recognition signal.

21 Claims, 5 Drawing Sheets

| WIRELESS SIGNAL MODULE LOCATION INFORMATION | WIRELESS SIGNAL MODULE | 1-1 WIRELESS SIGNAL MODULE | 1-2 WIRELESS SIGNAL MODULE | 1-3 WIRELESS SIGNAL MODULE |
|---|---|---|---|---|
| | DIRECTION | LEFT | TOP | RIGHT |
| SECOND DEVICE INFORMATION | DEVICE TYPE | PRINTER | | |
| | IDENTIFICATION INFORMATION | SAMSUNG PN101 | | |
| | PERMISSION | YES | | |
| | NETWORK ADDRESS | 192.168.0.1 | | |
| THIRD DEVICE INFORMATION | DEVICE TYPE | | PC | |
| | IDENTIFICATION INFORMATION | | SAMSUNG MAGIC STATION MV65 | |
| | PERMISSION | | NO | |
| | NETWORK ADDRESS | | 192.168.0.2 | |
| FOURTH DEVICE INFORMATION | DEVICE TYPE | | | NOTEBOOK |
| | IDENTIFICATION INFORMATION | | | SAMSUNG SENSE Q45 |
| | PERMISSION | | | YES |
| | NETWORK ADDRESS | | | 192.168.0.3 |

DEVICE AND RECOGNITION CONTROL METHOD AMONG DEVICES

CROSS-REFERENCE TO RELATED APPLICATION

This application claims the benefit under 35 U.S.C. §119(a) of a Korean Patent Application No. 10-2007-0102734, filed on Oct. 11, 2007, in the Korean Intellectual Property Office, the entire disclosure of which is incorporated herein by reference.

TECHNICAL FIELD

The following description relates to a device and recognition control method among devices, and more particularly, to a device and recognition control method among devices where the device transceives a device recognition signal to/from other devices, located in each direction, to recognize which device is located in each of the directions.

BACKGROUND

Using digital devices have become difficult as they are more diverse and complex than ever before. Accordingly, there is a need for an interface that allows users to more conveniently use such devices.

Computers are now used in and out of offices as they are portable, and many users carry their computers with them. Although sharing contents among computers using a network was available in a desktop environment, only recently have mobile devices been able to share contents due to increase in performance of mobile devices in a wireless communication environment and improvements in the mobile technology.

In a mobile environment, since a computing environment frequently changes, a connection among devices is typically required to be set for each device in order to copy or move contents from one another. This cumbersome task occurs not only in terms of software, but also with respect to a distributed hardware which may be connected to a keyboard, mouse, display, printer, and the like.

Accordingly, there is a need for new methods and/or devices which enable a user to more conveniently share hardware resources or software resources among the devices.

SUMMARY

In one general aspect, there is provided a device and recognition control method among devices where the device transceives a device recognition signal to/from other devices, located in each direction, to recognize which device is located in each of the directions.

In another general aspect, a recognition control method among devices includes receiving a second device recognition signal via a wireless signal module of a first device from a wireless signal module of a second device, and recognizing that the second device is located in a direction from the first device through the second device recognition signal. The method may further comprise receiving a first device recognition signal via the wireless signal module of the second device from the wireless signal module of the first device, and recognizing that the first device is located in a direction from the second device through the first device recognition signal, wherein the direction from the first device faces the direction from the second device. The method may further comprise receiving a third device recognition signal via a second wireless signal module of the first device from a wireless signal module of a third device, and recognizing that the third device is located in a second direction from the first device through the third device recognition signal. The first device may comprise a plurality of wireless signal modules provided to predetermined locations of the first device, and the method may further comprise transmitting a first device recognition signal via the wireless signal modules of the first device to respective wireless signal modules of other devices correspondingly facing the wireless modules of the first device. The method may further comprise receiving an input corresponding to the direction from the first device and with respect to an implementation of an application, determining that a device located in the direction from the first device is the second device, and transmitting application information about a computing operation of the application to the second device so as to have the second device perform a computing operation corresponding to the application information received from the first device.

In still another general aspect a wireless communication device includes a plurality of wireless signal modules which transceive a device recognition signal to/from another device, a device information extraction unit which extracts device information from a device recognition signal from a second device, wherein the device recognition signal of the second device is received by a wireless signal module among the plurality of wireless signal modules which faces towards the second device, and a device information storing unit which stores the device information corresponding to information about a direction of the second device. The device information extraction unit may extract device information from a device recognition signal from a third device, wherein the device recognition signal of the third device is received by a wireless signal module among the plurality of wireless signal modules which faces towards the third device, and the device information storing unit may store the device information from the third device corresponding to information about a direction of the third device. The wireless communication device may further comprise an application control unit which controls an implementation of an application, and receives direction information corresponding to the implementation of the application, and a device information reply unit which, where device information corresponding to the direction information is requested by the application control unit, extracts the device information corresponding to the direction information from the device information storing unit, and replies to the application control unit.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
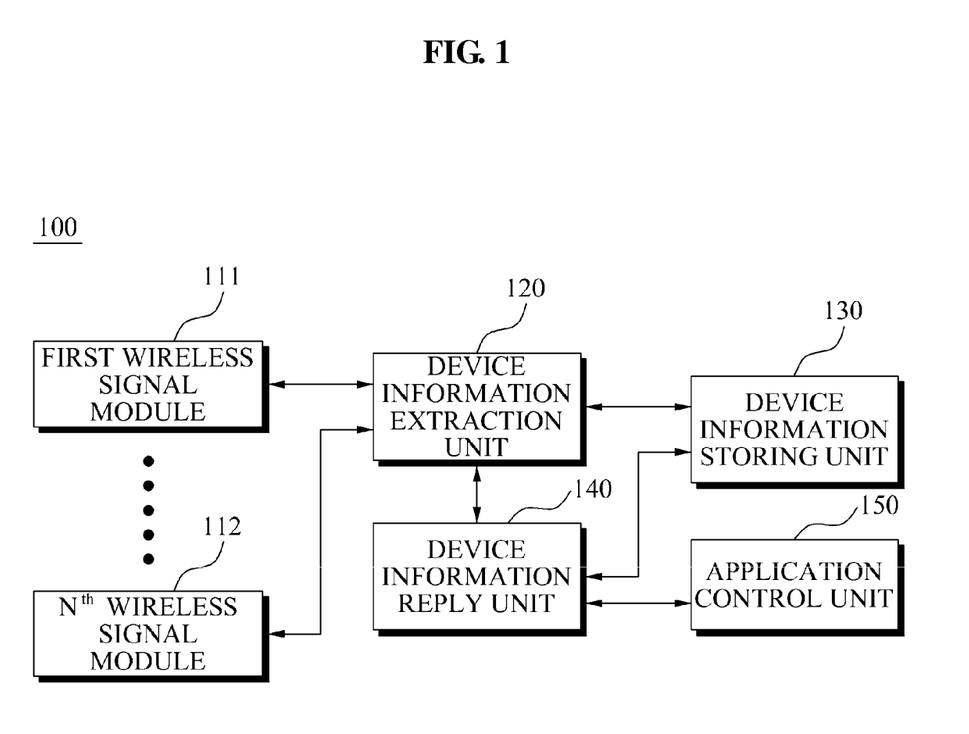
FIG. 1 is a block diagram illustrating a configuration of an exemplary device.

FIG. 1 illustrates a configuration of an exemplary device 100.

The device 100 includes a first wireless signal module 111 through an $N^{th}$ wireless signal module 112, a device information extraction unit 120, a device information storing unit 130, a device information reply unit 140, and an application control unit 150.

As an illustration, the device 100 may be one of various types of devices capable of data operation, such as a mobile communication terminal, personal digital assistant (PDA), personal computer (PC), notebook computer, printer, portable multimedia player (PMP), Moving Picture Experts Group (MPEG) Audio-Layer 3 (MP3) player, console game player, and the like.

The first wireless signal module 111 through the $N^{th}$ wireless signal module 112 may be externally installed on each side of the device 100. Also, the device information extraction unit 120, the device information storing unit 130, and the device information reply unit 140 may be embodied as a portion of hardware of the device 100, and/or as software of the device 100. The application control unit 150 may be embodied as a central control module of a central processing unit (CPU) or a many-core processing unit (MPU), which controls an entire operation of the device 100, of the device 100.

The first wireless signal module 111 through the $N^{th}$ wireless signal module 112 are installed in each side of the device 100 and transceive a device recognition signal to/from at least one other device, which is described in detail with reference to FIG. 2.

Figure 2:
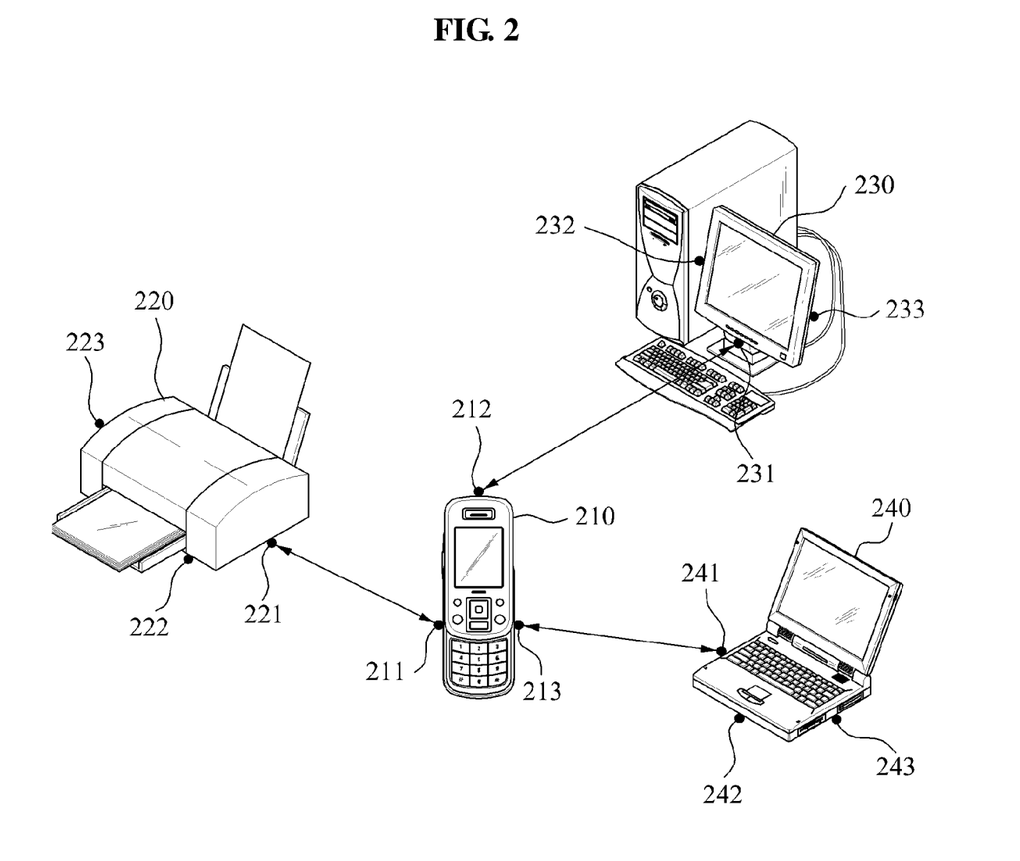
FIG. 2 is a diagram illustrating network connections between exemplary devices.

FIG. 2 illustrates network connections between exemplary devices.

As illustrated in FIG. 2, a first device 210 transceives a device recognition signal to/from a second device 220 located to the left of the first device 210, a third device 230 located above the first device 210, and a fourth device 240 located to the right of the first device 210, and recognizes a location of each of the second device 220, the third device 230, and the fourth device 240.

A 1-1 wireless signal module 211 may be installed on a left side of the first device 210, a 1-2 wireless signal module 212 may be installed on a top side of the first device 210, and a 1-3 wireless signal module 213 may be installed on a right side of the first device 210.

A 2-1 wireless signal module 221 may be installed on a right side of the second device 220, a 2-2 wireless signal module 222 may be installed on a bottom side of the second device 220, and a 2-3 wireless signal module 223 may be installed on a left side of the second device 220.

A 3-1 wireless signal module 231 may be installed on a bottom side of the third device 230, a 3-2 wireless signal module 232 may be installed on a left side of the third device 230, and a 3-3 wireless signal module 233 may be installed on a right side of the third device 230.

A 4-1 wireless signal module 241 may be installed on a left side of the fourth device 240, a 4-2 wireless signal module 242 may be installed on a bottom side of the fourth device 240, and a 4-3 wireless signal module 243 may be installed on a right side of the fourth device 240.

Each of the first device 210, second device 220, third device 230, and fourth device 240 may transceive the device recognition signal to/from each other via the wireless signal modules installed on each side of each of the first device 210, second device 220, third device 230, and fourth device 240.

For example, the first device 210 may transmit a first device recognition signal to the 2-1 wireless signal module 221 of the second device 220 via the 1-1 wireless signal module 211, and receive a second device recognition signal of the second device 220 from the 2-1 wireless signal module 221.

Also, the first device 210 may transmit the first device recognition signal to the 3-1 wireless signal module 231 of the third device 230 via the 1-2 wireless signal module 212, and receive a third device recognition signal of the third device 230 from the 3-1 wireless signal module 231.

Also, the first device 210 may transmit the first device recognition signal to the 4-1 wireless signal module 241 of the fourth device 240 via the 1-3 wireless signal module 213, and receive a fourth device recognition signal of the fourth device 240 from the 4-1 wireless signal module 241.

As described above, each of the first device 210, second device 220, third device 230, and fourth device 240 transceives a device recognition signal via a wireless signal module, installed on a side facing towards a device which is desired to be connected, and thereby may recognize in which direction a device is located.

In is understood that the description with reference to FIG. 2 is only an exemplary embodiment, and each of the first device 210, second device 220, third device 230, and fourth device 240 may be embodied to include a variety of wireless signal modules having a variety of directions. An exemplary device and recognition control method among devices will be described in more detail by referring to FIGS. 1 and 2.

Referring again to FIG. 1, the first wireless signal module 111 through the $N^{th}$ wireless signal module 112 may include, for example, a local area communication module capable of transceiving a very-short range wireless signal with distinct straightness. Specifically, the device recognition signal may be spread straightly in a direction that each wireless signal module faces, and thus each wireless signal module may recognize only another device located in a corresponding facing direction. The local area communication module may include, for example, at least one of a Radio Frequency Identification (RFID) module, Infrared Data Association (IrDA) module, Zigbee module, and Ultra Wideband (UWB) module.

The device information extraction unit 120 extracts device information from the device recognition signal, received from the first wireless signal module 111 through the $N^{th}$ wireless signal module 112, respectively.

For example, in FIG. 2, where the second device recognition signal is received from the 2-1 wireless signal module 221 of the second device 220 via the 1-1 wireless signal module 211 of the first device 210, the device information extraction unit 120 of the first device 210 may extract second device information from the second device recognition signal.

The device information may be embodied to include, for example, at least one of type information, identification information, permission information, and network address information of a device transmitting the device recognition signal.

The device information storing unit 130 may store the extracted device information and location information about the device transmitting the device recognition signal. The location information about the device may be embodied as, for example, location information of a wireless signal module receiving the device recognition signal from the device.

As a further example, the location information of the wireless signal module may be embodied as information about a direction that the wireless signal module faces. For example, in FIG. 2, location information of the 1-1 wireless signal module 211 of the first device 210 may be set as direction information of "left". Specifically, the first device 210 may set location information of the second device 220 as "left".

The device information storing unit 130 may store the device information and the location information of the wireless signal module in a form of a device information table. An exemplary device information table is described in detail with reference to FIG. 3.

Figure 3:
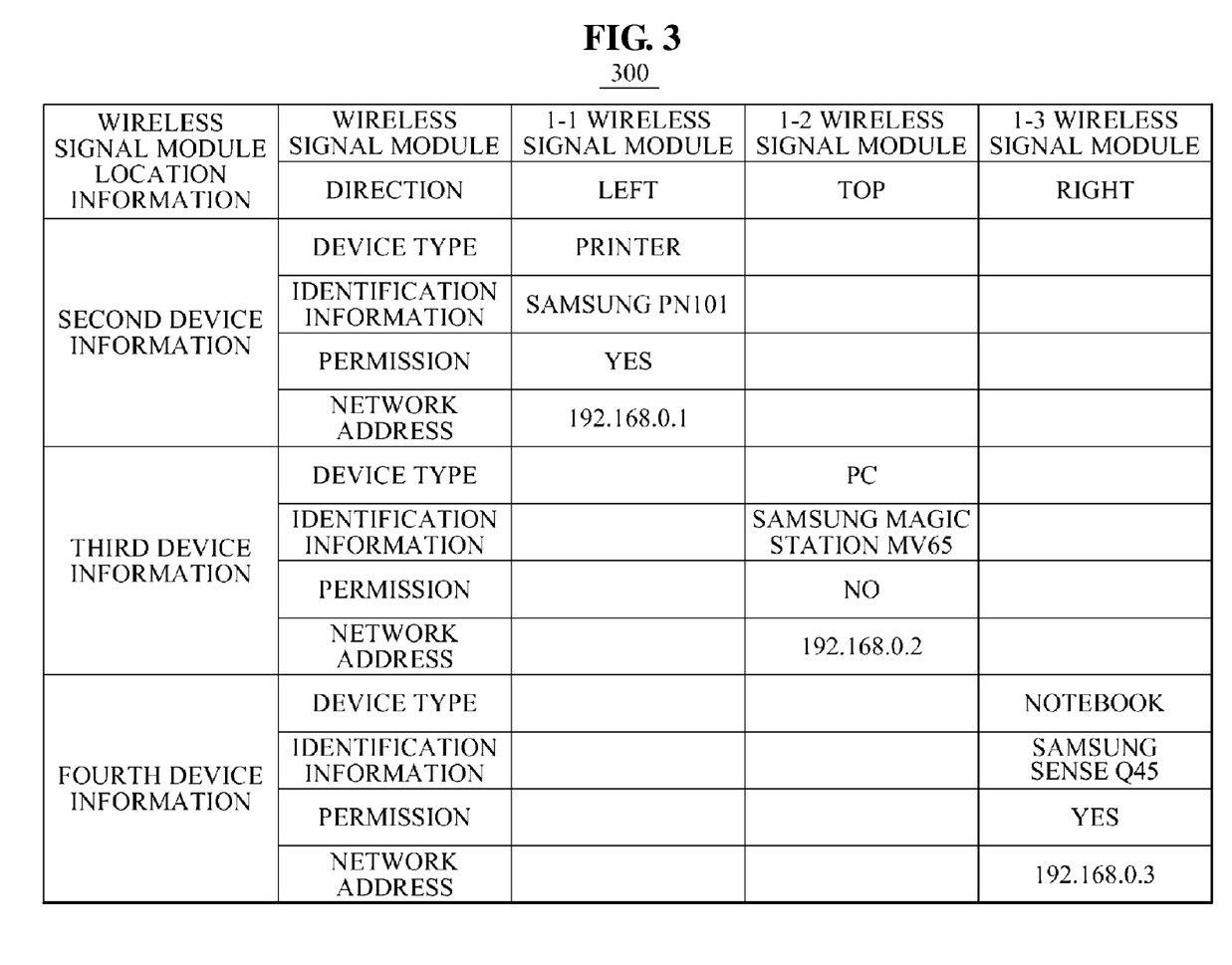
FIG. 3 is a diagram illustrating an exemplary device information table.

FIG. 3 illustrates an exemplary device information table 300.

As illustrated in FIG. 3, the first device 210 of FIG. 2 may store device information and location information of a wireless signal module with respect to each of the second device 220, third device 230, and fourth device 240, in the device information table 300.

A device information extraction unit 120 of the first device 210 may extract second device information from a second device recognition signal received via the 1-1 wireless signal module 211. Also, the device information extraction unit 120 of the first device 210 may extract third device information from a third device recognition signal received via the 1-2 wireless signal module 212. Moreover, the device information extraction unit 120 of the first device 210 may extract fourth device information from a fourth device recognition signal received via the 1-3 wireless signal module 213.

The device information extraction unit 120 may store the second device information, third device information, and fourth device information corresponding to the wireless signal modules 211, 212, and 213, respectively, which receives the corresponding second device recognition signal, third device recognition signal, and fourth device recognition signal, in the device information table 300. For example, the second device information corresponding to location information of the 1-1 wireless signal modules 211 may be stored, the third device information corresponding to location information of the 1-2 wireless signal module 212 may be stored, and the fourth device information corresponding to location information of the 1-3 wireless signal module 213 may be stored.

The location information of each of the wireless signal modules 211, 212, and 213 may include direction information according to a direction that a corresponding side of the first device 210 faces towards. In this instance, each of the wireless signal modules 211, 212, and 213 is installed on a corresponding side of the first device 210 shown in FIG. 2.

For example, location information of the 1-1 wireless signal module 211, installed on the left side of the first device 210, includes direction information of "left," location information of the 1-2 wireless signal module 212, installed on the top side of the first device 210, includes direction information of "top," and location information of the 1-3 wireless signal module 213, installed on the right side of the first device 210, includes direction information of "right."

The device information stored in the device information table 300 may include, for example, at least one of type information, identification information, permission information, management contents information, and network address information of each device.

For example, the second device information may include "printer" as type information of the second device 220, "Samsung PN101" as identification information of the second device 220, "yes" as permission information of the second device 220, and "192.168.0.1" as network address information of the second device 220. While not illustrated, the second device information may include management contents information about contents available in the second device 220.

The third device information may include "PC" as type information of the third device 230, "Samsung magic station MV65" as identification information of the third device 230, "no" as permission information of the third device 230, and "192.168.0.2" as network address information of the third device 230. While not illustrated, the third device information may include management contents information about contents available in the third device 230.

The fourth device information may include "notebook" as type information of the fourth device 240, "Samsung sense Q45" as identification information of the fourth device 240, "yes" as permission information of the fourth device 240, and "192.168.0.3" as network address information of the fourth device 240. While not illustrated, the fourth device information may include management contents information about contents available in the fourth device 240.

Referring again to FIG. 1, the device information storing unit 130 may further store device information about the device 100 in the device information table 300. For example, where the device 100 is a mobile communication terminal by Samsung Electronics Co., Ltd., type information of "mobile communication terminal," identification information of "Samsung Anycall SCH-V940," permission information of "yes," and network address information of "192.168.0.0" may be stored in the device information table 300. Accordingly, the first wireless signal module 111 through the $N^{th}$ wireless signal module 112 may transmit a device recognition signal including the device information described above to each of the devices.

The application control unit 150 may control an implementation of an application. Specifically, the application control unit 150 may control the implementation of the application supported by the device 100. The application control unit 150 may receive direction information and an input with respect to the implementation of the application from a user. The user may input a particular direction and initiate the implementation of the application through an input device of the device 100.

In this embodiment, the application control unit 150 inquires about device information corresponding to the input direction information, received from the user, to the device information reply unit 140.

The device information reply unit 140 retrieves the device information, inquired by the application control unit 150, from the device information storing unit 130, and replies.

For example, where the user inputs the direction information of "left" and initiates the implementation of an application, the application control unit 150 inquires about device information corresponding to the input direction information of "left" to the device information reply unit 140.

The device information reply unit 140 extracts second device information corresponding to the input direction information of "left," from the device information table 300 of the device information storing unit 130. The device information reply unit 140 provides the extracted second device information to the application control unit 150.

The application control unit 150 transmits application information with respect to the implementation of the application to the second device 220 via, for example, a wireless local area network (WLAN) or Ethernet, and the like, using the second device information. The second device 220 performs an operation according to the application information.

For example, where the user performs an input with respect to the first device 210 corresponding to printing of a text file, and pushes a left button of a keypad of the first device 210, the first device 210 senses that a device located on the left of the first device 210 is the second device 220 through the device information table 300. As shown in FIG. 2, the first device 210 is embodied as a mobile communication terminal and the second device 220 is embodied as a printer. The first device 210 transmits the text file to the second device 220 using network address information of the second device information. The network address information of the second device information is stored in the device information table 300. Accordingly, the second device 220 may receive and print the text file.

As another example, where the user performs an input with respect to the first device 210 corresponding to reproduction of a video file, and pushes a top button of the keypad of the first device 210, the first device 210 senses that a device located on the top of the first device 210 is the third device 230 through the device information table 300. As shown in FIG. 2, the third device 230 is embodied as a PC. The first device 210 transmits the video file to the third device 230 using network address information of the third device information. The network address information of the third device information is stored in the device information table 300. Accordingly, the third device 230 may receive and replay the video file.

Still as another example, where the user performs an input with respect to the first device 210 corresponding to displaying of an image file, and pushes a right button of the keypad of the first device 210, the first device 210 senses that a device located on the right of the first device 210 is the fourth device 240 through the device information table 300. As shown in FIG. 2, the fourth device 240 is embodied as a notebook. The first device 210 transmits the image file to the fourth device 240 using network address information of the fourth device information. The network address information of the fourth device information is stored in the device information table 300. Accordingly, the fourth device 240 may receive and display the image file.

As described above, a user of a device may transmit contents belonging to the device to other devices, located around the device, and enable the contents to be displayed, reproduced, stored, or printed via the other devices, by simply inputting a particular direction without setting a respective network connection between the devices.

Figure 4:
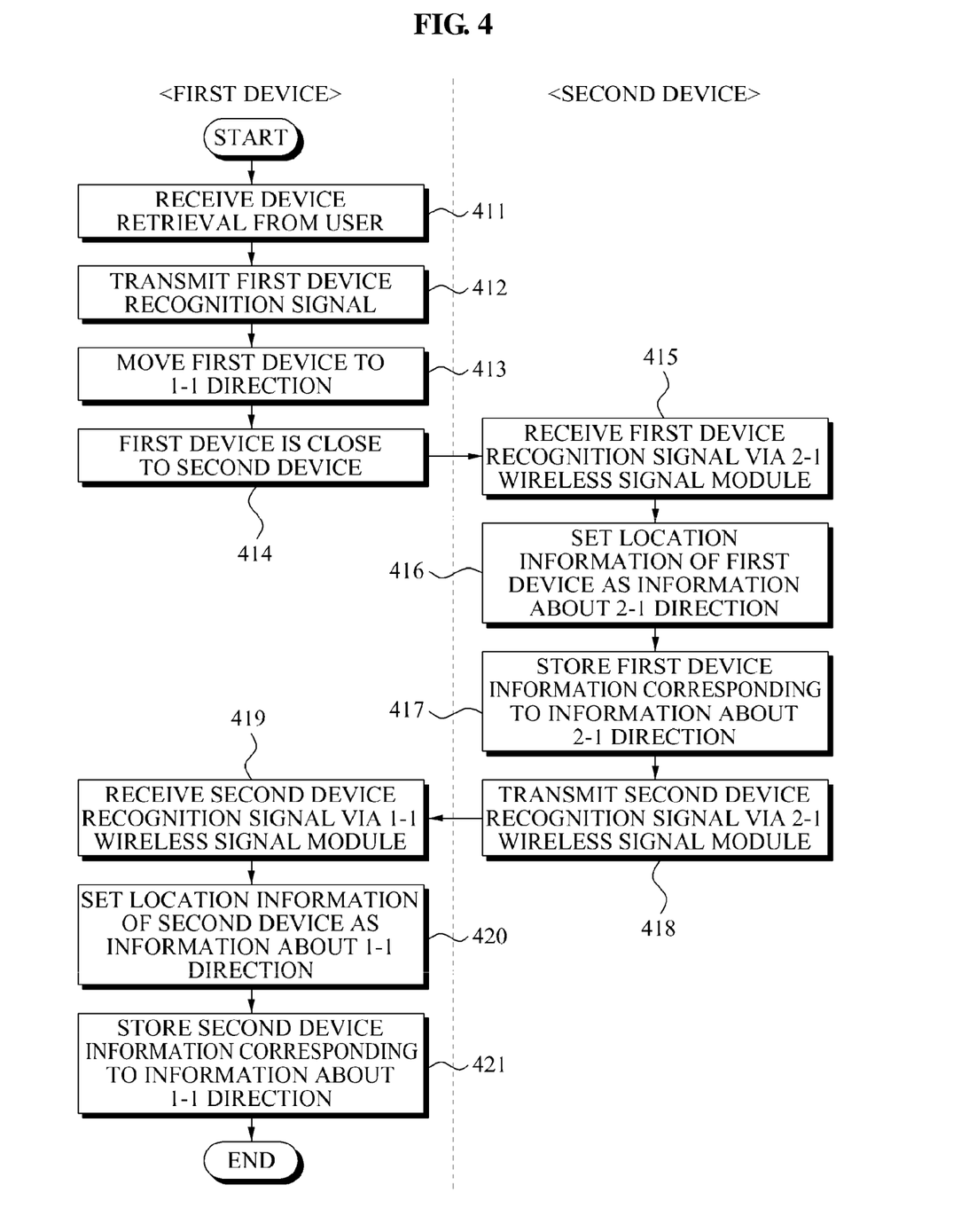
FIG. 4 is a flowchart illustrating an exemplary recognition control method among devices.

FIG. 4 illustrates an exemplary recognition control method among devices. An exemplary recognition control method performed between a first device and a second device will be described with reference to FIG. 2 and the descriptions thereof.

In operation 411, the first device receives a surrounding device retrieval request from a user. In operation 412, the first device transmits a first device recognition signal to each direction via a 1-1 wireless signal module through a 1-N wireless signal module.

In operation 413, where the user of the first device moves the first device to a 1-1 direction, the 1-1 wireless signal module faces towards the 1-1 direction. In operation 414, the first device is adjacent to the second device located in the 1-1 direction.

Since the first device draws closer to the second device, the second device receives the first device recognition signal, transmitted via the 1-1 wireless signal module of the first device, via a 2-1 wireless signal module in operation 415. The 2-1 wireless signal module may be installed in the second device, and faces the 1-1 wireless signal module. In operation 416, the second device sets location information of the first device as information about a 2-1 direction. The 2-1 wireless signal module, which receives the first device recognition signal, faces towards the 2-1 direction. In operation 417, the second device extracts first device information from the first device recognition signal, and stores the first device information corresponding to the information about the 2-1 direction in a second device information table. In operation 418, the second device transmits a second device recognition signal to the 1-1 wireless signal module of the first device via the 2-1 wireless signal module.

In operation 419, the first device receives the second device recognition signal via the 1-1 wireless signal module. In operation 420, the first device sets location information about the second device as information about a 1-1 direction. The 1-1 wireless signal module faces towards the 1-1 direction. In operation 421, the first device extracts second device information from the second device recognition signal, and stores the second device information corresponding to the information about the 1-1 direction in a first device information table.

Figure 5:
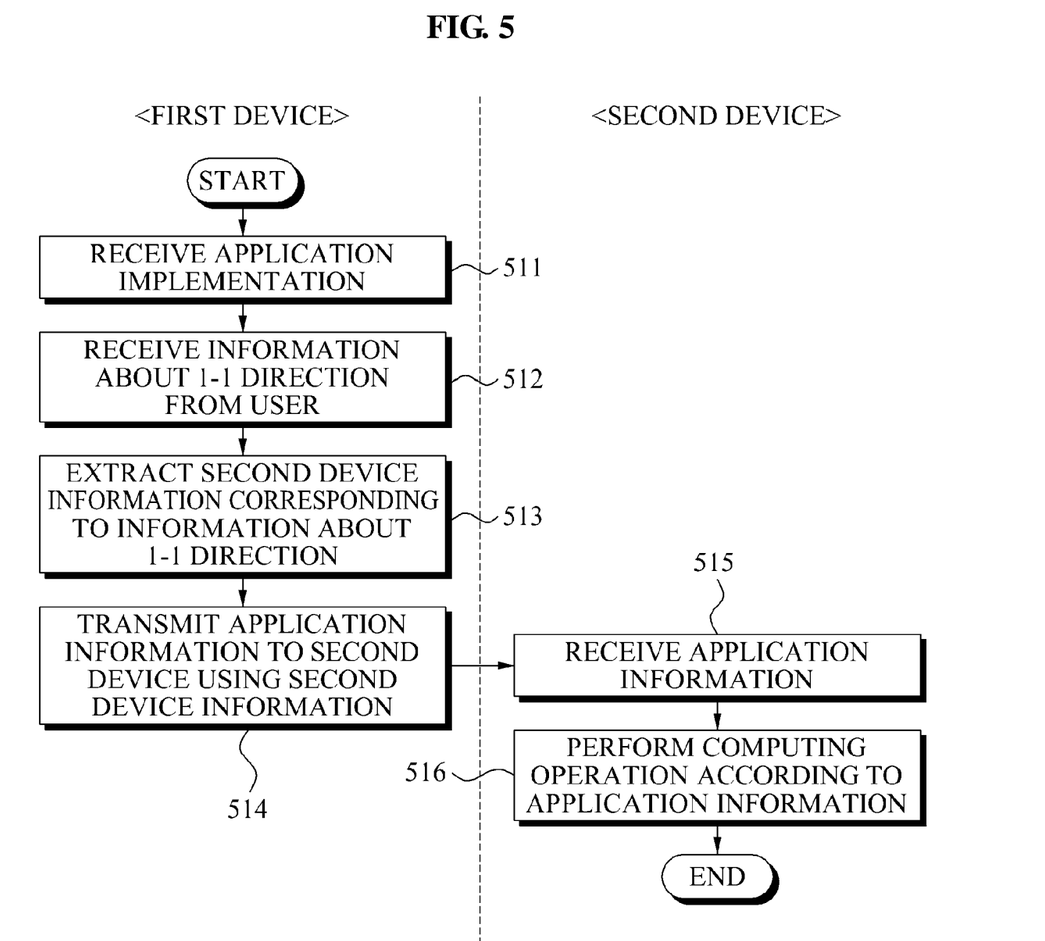
FIG. 5 is a flowchart illustrating an exemplary computing operation control method among devices.

FIG. 5 illustrates an exemplary computing operation control method among devices. In operation 511, where a recognition operation between a first device and a second device is completed, the first device receives a request for implementation of an application from a user. In operation 512, the first device receives information about a 1-1 direction. It is understood that the operations 511 and 512 are exemplary and that the operations may be performed in a different order or performed as a combined operation.

In operation 513, the first device senses that a device corresponding to the information about the 1-1 direction is the second device by referring to a first device information table, and extracts second device information from the first device information table. In operation 514, the first device transmits application information with respect to the implementation of the application to the second device using the second device information.

In operation 515, the second device receives the application information from the first device. In operation 516, the second device performs a computing operation according to the application information.

Although a recognition control method among devices and computing operation control method among devices have been described with respect to two devices in FIGS. 4 and 5, it will be apparent to those skilled in the related art that a recognition control method among devices and computing operation control method among devices described with reference to FIGS. 4 and 5 may be embodied for more than two devices. For example, a recognition control method among devices and computing operation control method among devices may be performed among the devices described with reference to FIGS. 1 through 3.

The recognition control method among devices and computing operation control method among devices described above may be recorded in computer-readable media that includes program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and method described above.

According to the embodiments described above, a device transceives a device recognition signal to/from other devices, located in each direction, recognizes which device is located in each of the directions. Accordingly, an application may be implemented in another device simply by inputting information about a direction of the another device. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A recognition control method among devices, the recognition control method comprising:
receiving a second device recognition signal via a wireless signal module of a first device from a wireless signal module of a second device;
recognizing that the second device is located in a direction from the first device through the second device recognition signal;
receiving a first device recognition signal via the wireless signal module of the second device from the wireless signal module of the first device;
recognizing that the first device is located in a direction from the second device through the first device recognition signal, wherein the wireless signal module of the first device communicates with the wireless signal module of the second device based on when the wireless signal module of the first device faces the wireless signal module of the second device;
receiving an input corresponding to the direction from the first device and with respect to an implementation of an application;
determining that a device located in the direction from the first device is the second device; and
transmitting application information about a computing operation of the application to the second device so as to have the second device perform a computing operation corresponding to the application information received from the first device.

2. The recognition control method of claim 1, wherein:
the first device comprises a plurality of wireless signal modules provided to predetermined locations of the first device, and
the method further comprises transmitting a first device recognition signal via the wireless signal modules of the first device to respective wireless signal modules of other devices correspondingly facing the wireless modules of the first device.

3. The recognition control method of claim 1, further comprising:
receiving a third device recognition signal via a second wireless signal module of the first device from a wireless signal module of a third device; and
recognizing that the third device is located in a second direction from the first device through the third device recognition signal.

4. The recognition control method of claim 1, wherein the recognizing that the first device is located in the direction from the second device comprises:
setting location information of the first device as information about the direction from the second device;
extracting first device information from the first device recognition signal; and
storing the first device information corresponding to the information about the direction from the second device.

5. The recognition control method of claim 4, wherein the first device information comprises one or more of type information, identification information, permission information, management contents information, and network address information of the first device.

6. The recognition control method of claim 1, wherein the recognizing that the second device is located in the direction of the first device comprises:
setting location information of the second device as information about the direction from the first device;
extracting second device information from the second device recognition signal; and
storing the second device information corresponding to the information about the direction from the first device.

7. The recognition control method of claim 6, wherein the second device information comprises one or more of type information, identification information, permission information, management contents information, and network address information of the second device.

8. A non-transitory computer-readable recording medium storing a program that, when read by at least one computer, causes the computer to perform the recognition control method among devices according to claim 1.

9. The method of claim 1, the method further comprising:
receiving instructions from a user of the first device to communicate with the second device that is determined by the user.

10. A wireless communication device, comprising:
a plurality of wireless signal modules configured to transceive a device recognition signal to/from another device, one of the plurality of wireless signal modules communicating with a wireless signal module of the other device based on when the wireless signal module of the first device faces the wireless signal module of the second device;
a device information extraction unit configured to extract device information from a device recognition signal from a second device, wherein the device recognition signal of the second device is received by a wireless signal module among the plurality of wireless signal modules which faces towards the second device;
a device information storing unit configured to store the device information corresponding to information about a direction of the second device;
an application control unit configured to:
control an implementation of an application; and
receive direction information corresponding to the implementation of the application; and a device information reply unit configured to, where device information corresponding to the direction information is requested by the application control unit:
  extract the device information corresponding to the direction information from the device information storing unit; and
  reply to the application control unit.

11. The device of claim 10, wherein the plurality of the wireless signal modules transmit a device recognition signal of the device, and where the device is moved to the direction of the second device, the wireless signal module that received the device recognition signal from the second device transmits the device recognition signal of the device to the second device.

12. The device of claim 10, wherein:
  the device information extraction unit extracts device information from a device recognition signal from a third device, wherein the device recognition signal of the third device is received by a wireless signal module among the plurality of wireless signal modules which faces towards the third device; and
  the device information storing unit stores the device information from the third device corresponding to information about a direction of the third device.

13. The device of claim 10, wherein the device information comprises one or more of type information, identification information, permission information, management contents information, and network address information of the second device.

14. The device of claim 10, wherein, in response to the device information received from the device information reply unit being the second device information, the application control unit transmits application information to the second device using the second device information so as to have the second device perform a computing operation corresponding to the application information, the application information corresponding to the implementation of the application.

15. A recognition control method among devices, the recognition control method comprising:
  receiving a second device recognition signal via one of a plurality of wireless signal modules provided to a first device;
  recognizing a direction to the second device according to which of the wireless signal modules receives the second device recognition signal;
  transmitting an input corresponding to the direction of the first device and with respect to an implementation of an application, wherein a device located in the direction from the first device is determined to be the second device; and
  transmitting application information about a computing operation of the application to the second device so as to have the second device perform a computing operation corresponding to the application information.

16. A recognition control method among devices, the recognition control method comprising:
  receiving a second device recognition signal via a wireless signal module of a first device from a wireless signal module of a second device; and
  recognizing that the second device is located in a direction from the first device through the second device recognition signal;
  receiving an input corresponding to the direction from the first device and with respect to an implementation of an application;
  determining that a device located in the direction from the first device is the second device; and
  transmitting application information about a computing operation of the application to the second device so as to have the second device perform a computing operation corresponding to the application information received from the first device.

17. The method of claim 16, further comprising:
  receiving instructions from a user of the first device to communicate with the second device that is determined by the user.

18. The method of claim 16, the method further comprising:
  setting location information of the second device as information about the direction from the first device;
  extracting second device information from the second device recognition signal; and
  storing the second device information corresponding to the information about the direction from the first device,
  wherein the second device information comprises permission information.

19. The method of claim 16, wherein the application information includes data to be processed and output by the second device.

20. A wireless communication device, comprising:
  a plurality of wireless signal modules configured to transceive a device recognition signal to/from another device;
  a device information extraction unit configured to extract device information from a device recognition signal from a second device, wherein the device recognition signal of the second device is received by a wireless signal module among the plurality of wireless signal modules which faces towards the second device;
  a device information storing unit configured to store the device information corresponding to information about a direction of the second device;
  an application control unit configured to:
    control an implementation of an application; and
    receive direction information corresponding to the implementation of the application; and
  a device information reply unit configured to, where the device information corresponding to the direction information is requested by the application control unit:
    extract the device information corresponding to the direction information from the device information storing unit; and
    reply to the application control unit.

21. The device of claim 20, wherein in response to the device information received from the device information reply unit being the second device information, the application control unit transmits application information to the second device using the second device information so as to have the second device perform a computing operation corresponding to the application information, the application information corresponding to the implementation of the application.

* * * * *